(12) United States Patent
Takeuchi et al.

(10) Patent No.: US 12,461,327 B2
(45) Date of Patent: Nov. 4, 2025

(54) FIBER OPTIC MODULE HAVING HIGHLY ACCESSIBLE PORTS

(71) Applicant: Go!Foton Holdings, Inc., Somerset, NJ (US)

(72) Inventors: Kenichiro Takeuchi, North Brunswick, NJ (US); David Zhi Chen, Dallas, TX (US)

(73) Assignee: Go!Foton Holdings, Inc., Somerset, NJ (US)

( * ) Notice: Subject to any disclaimer, the term of this patent is extended or adjusted under 35 U.S.C. 154(b) by 410 days.

(21) Appl. No.: 18/079,462

(22) Filed: Dec. 12, 2022

(65) Prior Publication Data

US 2023/0204892 A1    Jun. 29, 2023

Related U.S. Application Data

(60) Provisional application No. 63/293,359, filed on Dec. 23, 2021.

(51) Int. Cl.
  *G02B 6/00* (2006.01)
  *G02B 6/44* (2006.01)

(52) U.S. Cl.
  CPC .................. *G02B 6/4471* (2013.01)

(58) Field of Classification Search
  CPC ............. G02B 6/4471; G02B 6/44526; G02B 6/4455; G02B 6/00
  See application file for complete search history.

(56) References Cited

U.S. PATENT DOCUMENTS

| | | | |
|---|---|---|---|
| 5,717,810 A | 2/1998 | Wheeler | |
| 6,384,896 B1 | 5/2002 | Tatsuduki | |
| 8,879,882 B2 * | 11/2014 | Conner | G02B 6/44524 |
| | | | 385/134 |
| 2013/0196538 A1 | 8/2013 | Takeuchi et al. | |
| 2015/0264843 A1 | 9/2015 | Alshinnawi et al. | |
| 2019/0353854 A1 * | 11/2019 | Radelet | G02B 6/3879 |

FOREIGN PATENT DOCUMENTS

| | | |
|---|---|---|
| EP | 3405825 B1 | 9/2021 |
| JP | S59-119068 U | 8/1984 |
| JP | H06-020057 U | 3/1994 |
| JP | 2010-122527 A | 6/2010 |
| JP | 2015-506647 A | 3/2015 |
| JP | 6979507 B1 | 12/2021 |
| WO | 2020091823 A1 | 5/2020 |

OTHER PUBLICATIONS

Extended European Search Report issued in Appln. No. 22215873.5 mailed May 3, 2023 (11 pages).

* cited by examiner

Primary Examiner — Jennifer Doan
(74) Attorney, Agent, or Firm — Lerner David LLP

(57) ABSTRACT

Cable connection components including a cable connection module having a body; and an interface portion rotatably coupled to the body, the interface portion configured to accommodate a plurality of port holders coupled to the interface portion in a movable fashion, and each of the port holders configured to hold one or more adapters for receiving respective cable connection terminals.

12 Claims, 10 Drawing Sheets

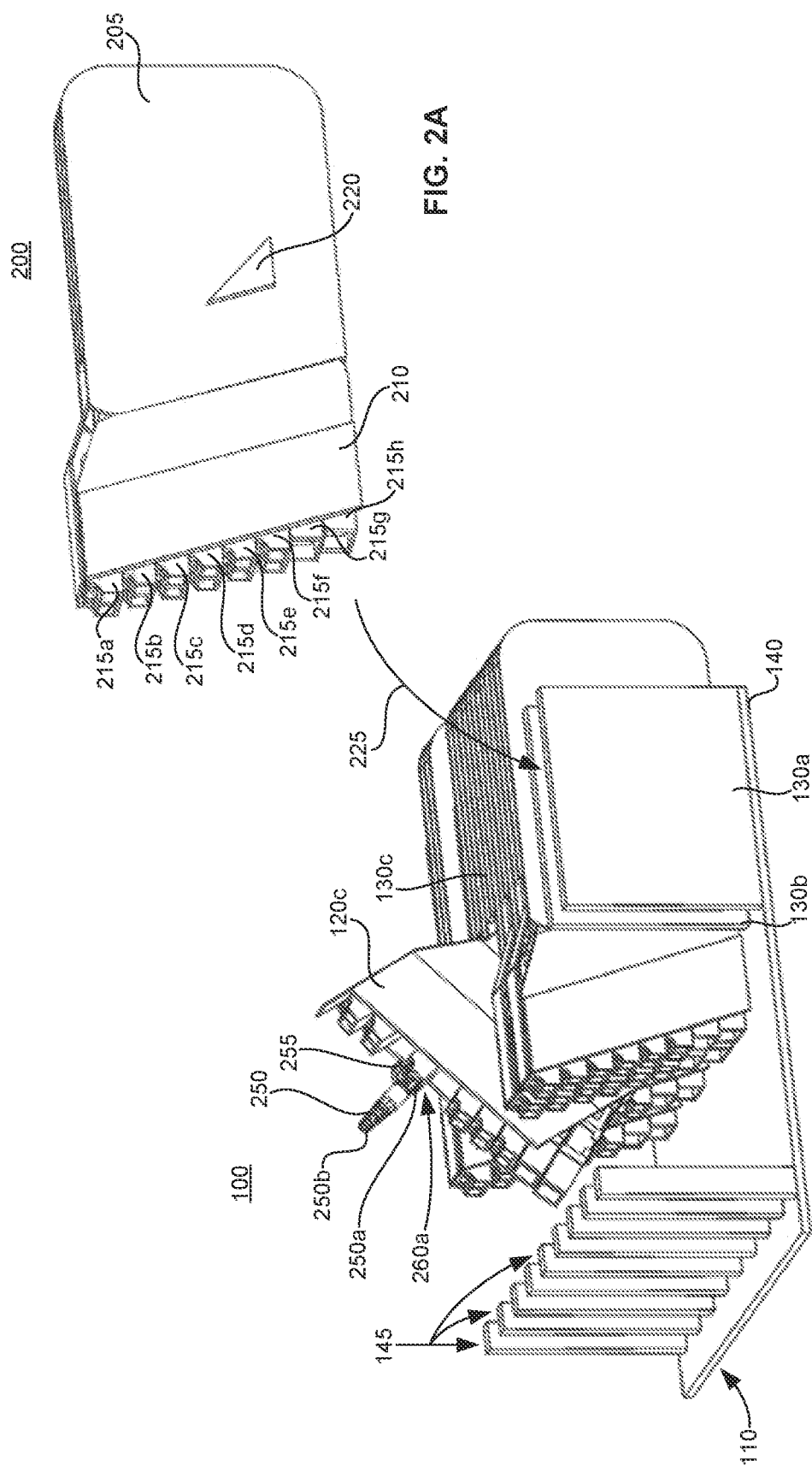

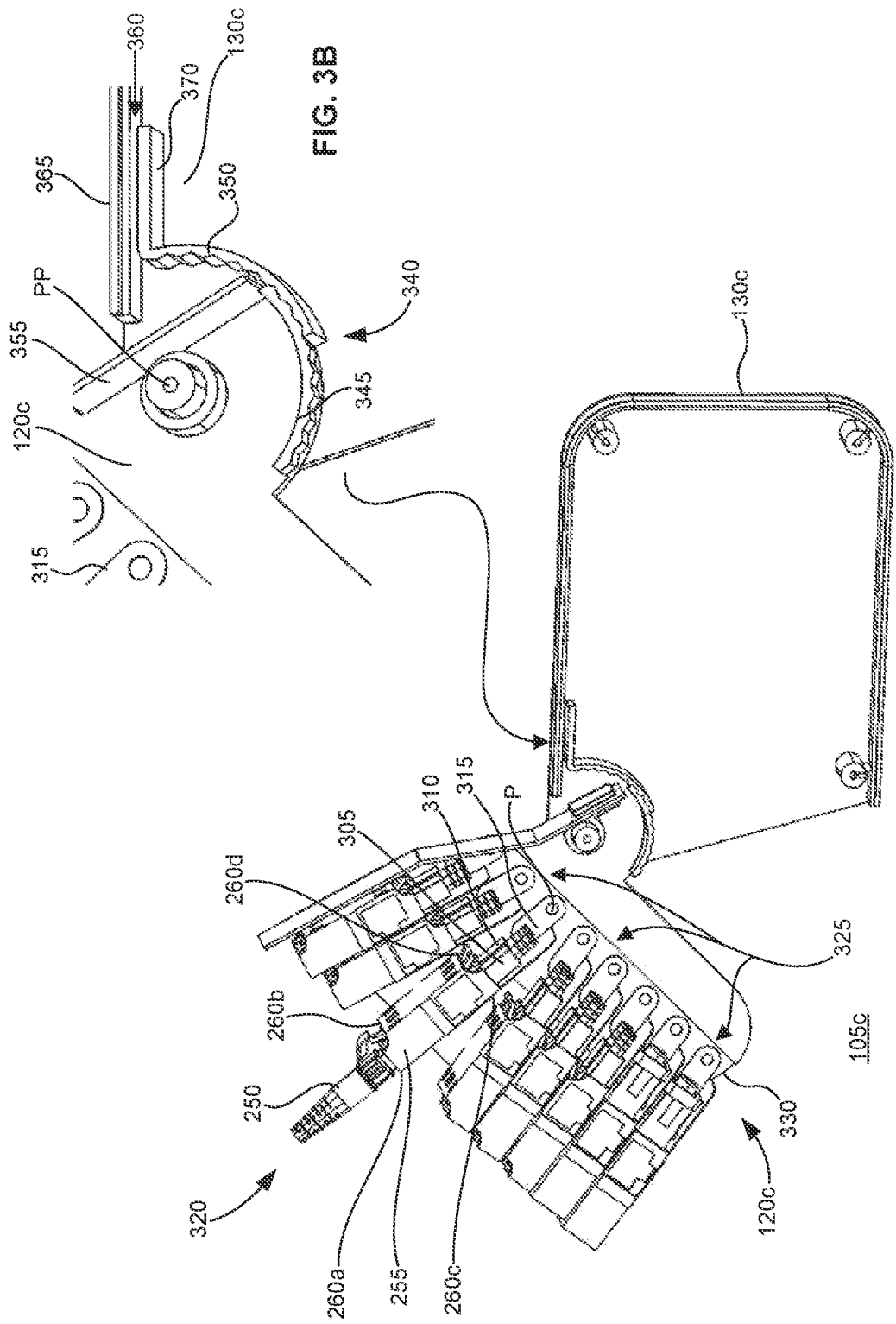

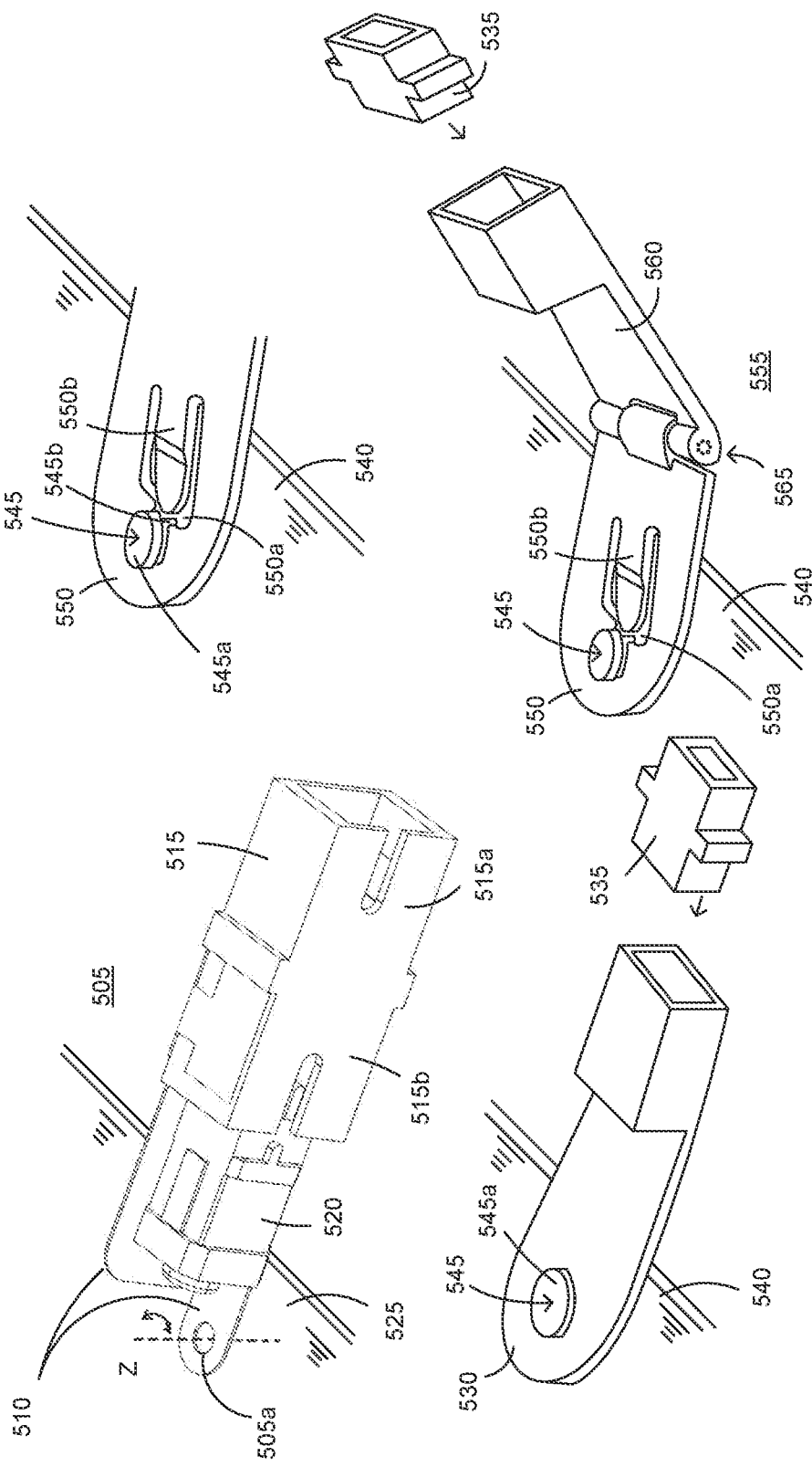

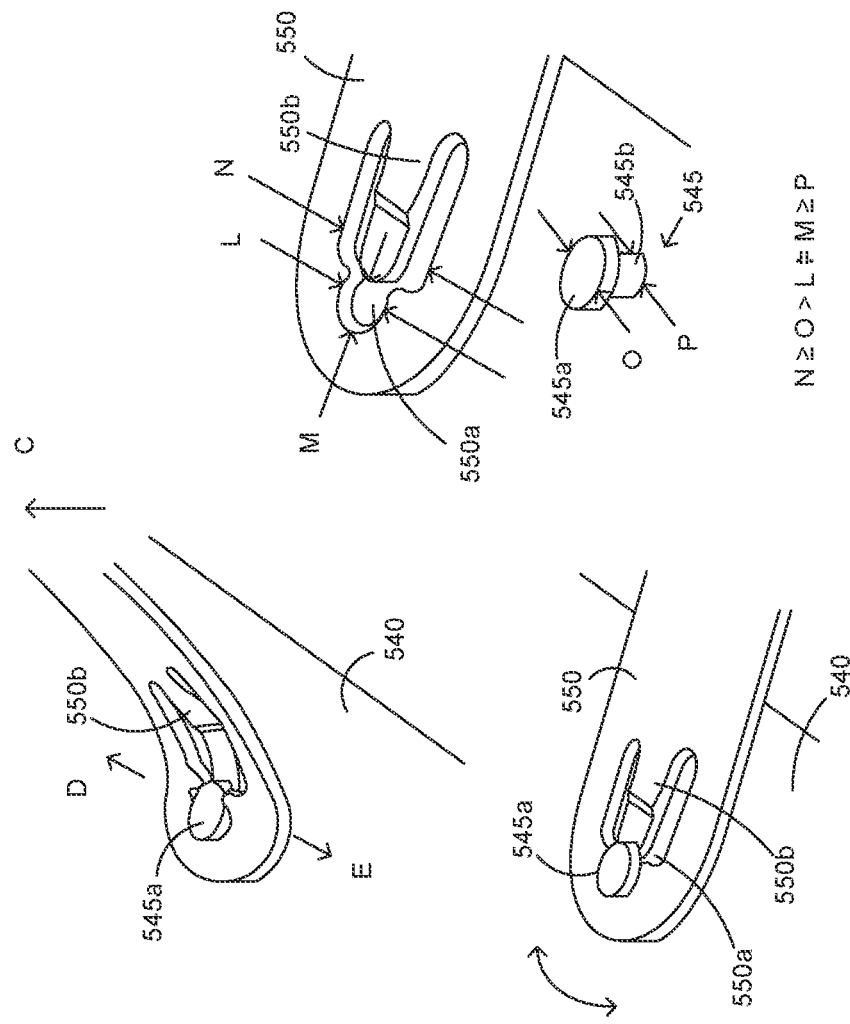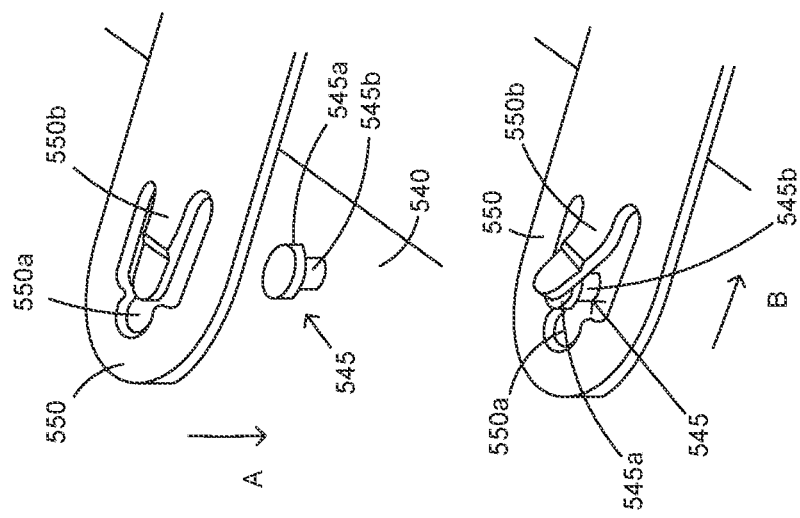

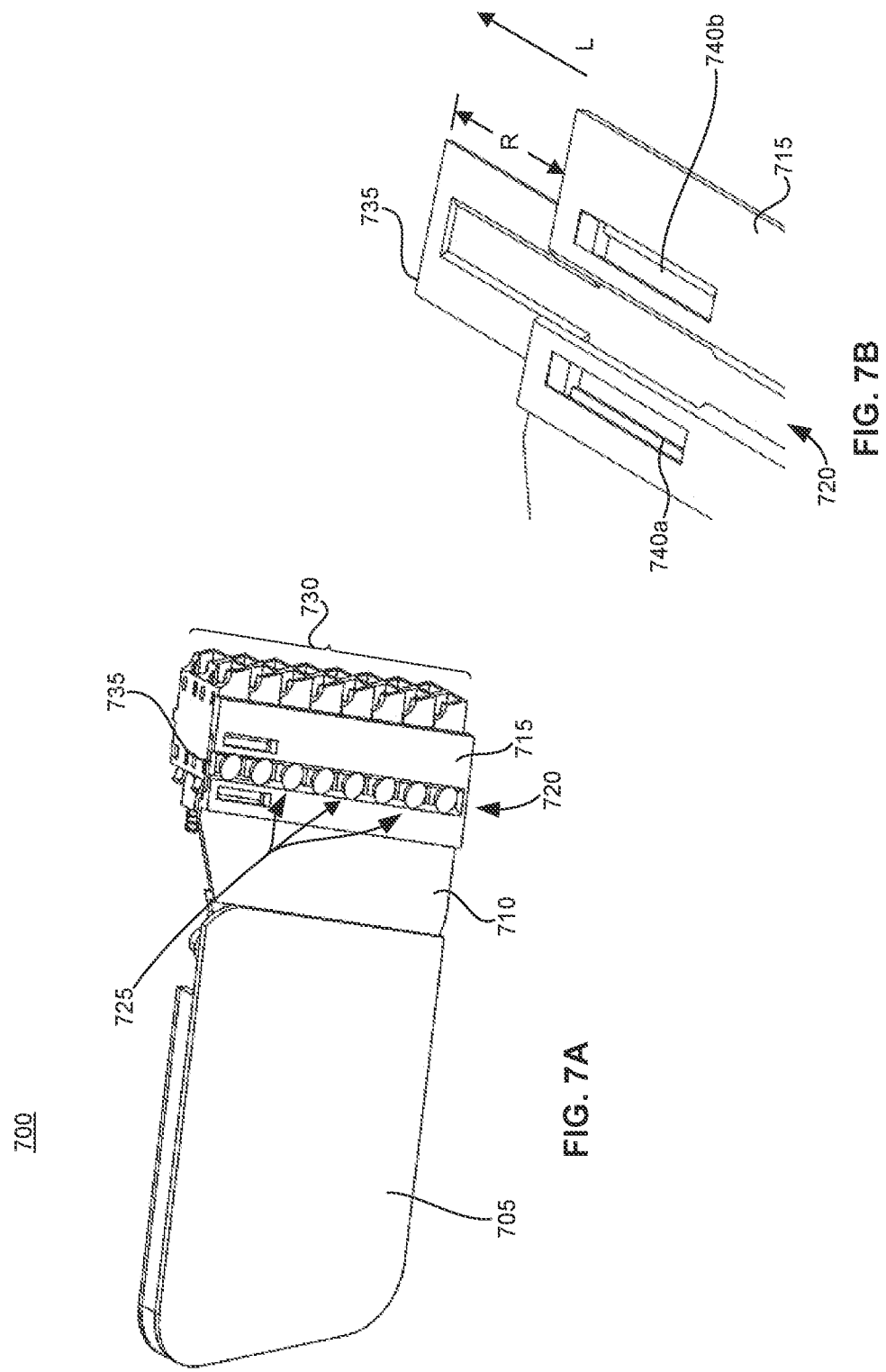

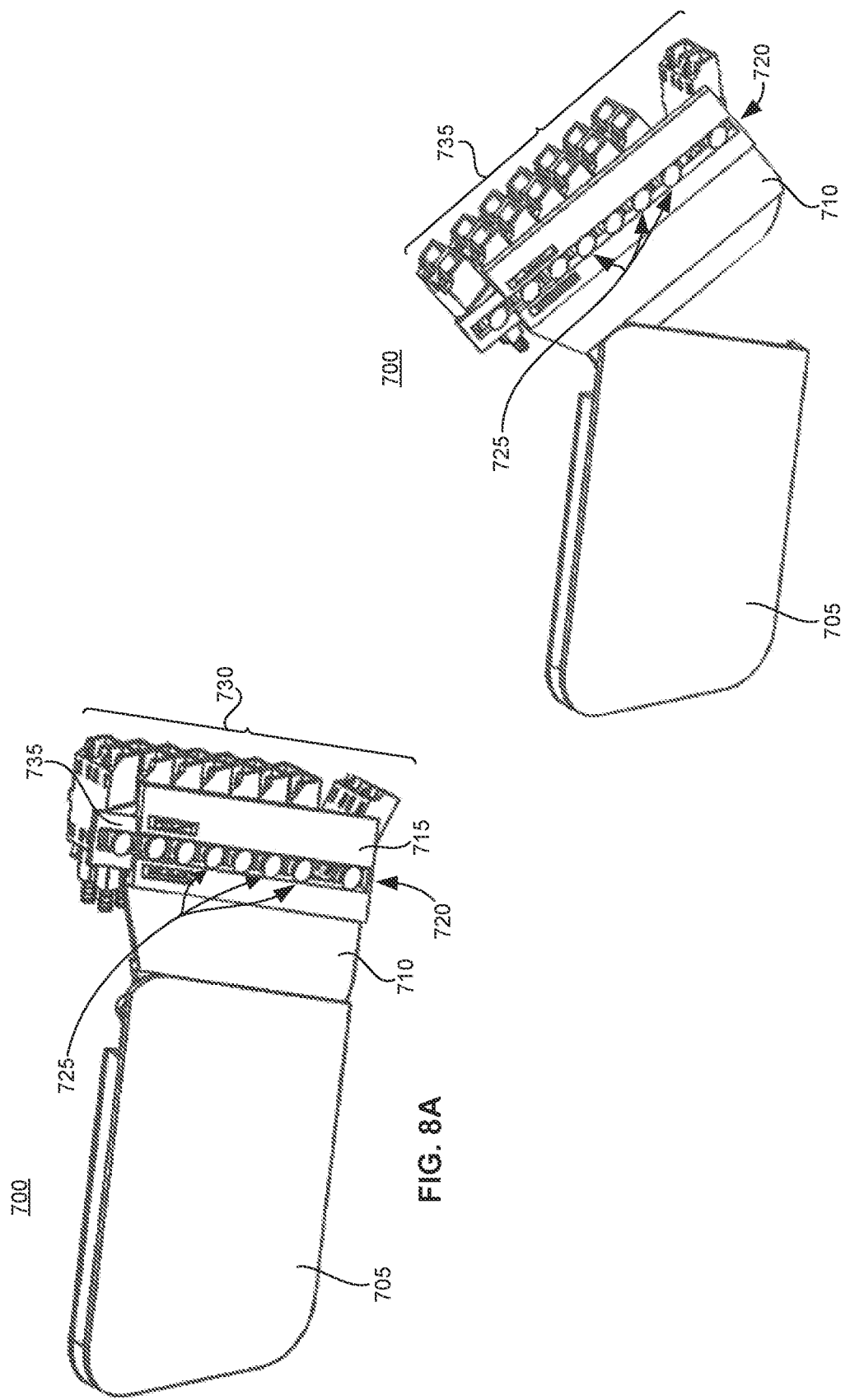

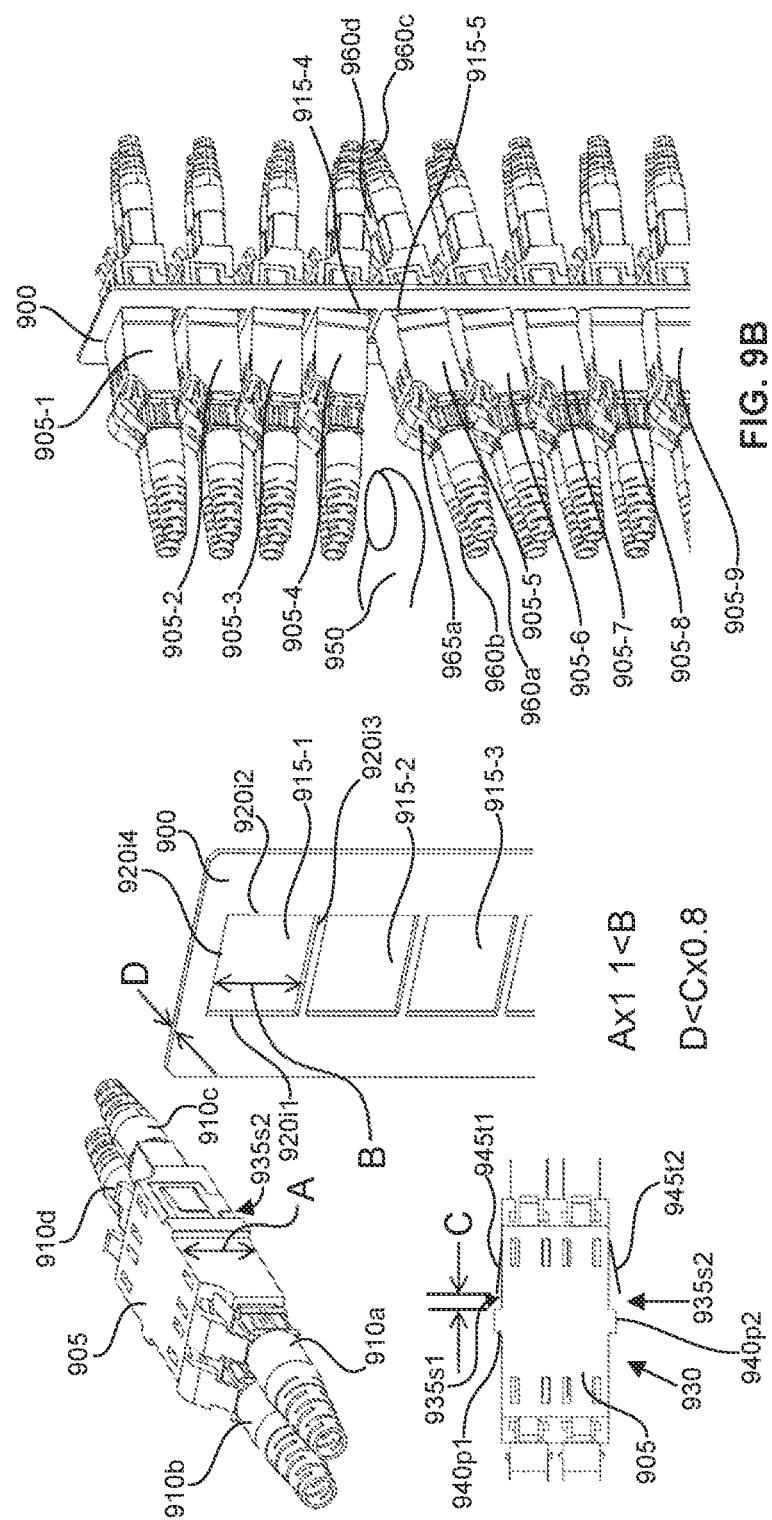

FIBER OPTIC MODULE HAVING HIGHLY ACCESSIBLE PORTS

CROSS-REFERENCE TO RELATED APPLICATION

The present application claims the benefit of the filing date of U.S. Provisional Application No. 63/293,359, filed on Dec. 23, 2021, the disclosure of which is hereby incorporated herein by reference.

BACKGROUND

The increasing deployment of electronic and fiber optic networks has given rise to an increasing need to manage the routing of signals in such networks. Often, the routing of signals is managed through the routing of cables associated with the signals and involves the use of multi-port modules that allow for selective connection between cables at designated points in a network.

The increasing need to manage signal routing is particularly acute with respect to fiber optic communications. For example, a fiber optic signal from a source location may need to be demultiplexed into a multiple of fiber optic signals destined for a multiple of different destination locations; or a multiple of fiber optic signals from a multiple of different source locations may need to be multiplexed into a single signal destined for a destination location that is different from all of the source locations.

Modules such as patch panels are widely used in network systems to monitor, interconnect and test circuits. A patch panel generally consists of a two-sided array of connection ports that are adapted to receive communication lines, such as fiber optic cables. The connection ports may themselves be two-sided, with the cable inserted on one side of a given connection port being communicatively coupled to the cable inserted on the other side of the same connection port.

Patch panels have shrunken in size over time in order to conserve space. However, as the patch panel shrinks in size, it also becomes increasingly difficult to maintain the patch panel and manage the cable connections. The cables are connected and disconnected by manual latching mechanisms, and a user must be able to access the latching mechanisms in order to latch or unlatch a cable with its corresponding connection port. Ultimately, access to the cable connections to manually latch and unlatch cables is an important feature of a patch panel, or any other cable connection module. Moreover, new cable connection modules are often required to be physically compatible with existing equipment such as an existing module chassis.

BRIEF SUMMARY

It has been recognized that there is a desire for a cable connection module that provides for ease of access to connectors of the module while the module is positioned in a chassis. It has been further recognized that the chassis may be of the type in which the cable connection module is stacked with other cable connection modules, e.g., vertically or horizontally, and in which the modules may be separated by walls. In light of the desire for cable connection modules and systems the present technology is provided.

In accordance with an aspect of the technology described in this disclosure, the technology provides a cable connection module including a body; and an interface portion rotatably coupled to the body, the interface portion configured to accommodate a plurality of port holders coupled to the interface portion in a movable fashion, and each of the port holders configured to hold one or more adapters for receiving respective cable connection terminals.

In accordance with another aspect of the technology described in this disclosure, the technology provides a port holder including a holding portion; and a mounting section, the mounting section including an opening and a tongue, the opening configured to receive an engagement member, and the tongue being deformable in a first direction that allows the mounting section to be connected to the engagement member in a movable fashion, and deformable in a second direction that allows the mounting section to be disconnected from the engagement member.

In accordance with still another aspect of the technology described in this disclosure, the technology provides a cable connection assembly including a chassis for securing a plurality of cable connection modules; and a plurality of cable connection modules, at least one of the cable connection modules including a body, and an interface portion rotatably coupled to the body, the interface portion configured to accommodate a plurality of port holders coupled to the interface portion in a movable fashion, and each of the port holders configured to hold one or more adapters for receiving respective cable connection terminals.

BRIEF DESCRIPTION OF THE DRAWINGS

The accompanying drawings are not intended to be drawn to scale. Also, for purposes of clarity not every component may be labeled in every drawing.

FIG. 2A is a perspective view of a cable connection module of an embodiment apart from any chassis.

FIG. 2B is a perspective view of the cable connection assembly of FIG. 1 with one of the cable connection modules having an interface portion of the module rotated relative to a body of the module.

FIG. 3A is a cutaway view of a cable connection module of the cable connection assembly of FIG. 2B, showing the internal structure of the interface portion of the module and the internal structure of the body of the module, with the interface portion rotated relative to the body.

FIG. 3B is a detailed view of a rotation position stabilizer that allows the interface portion of FIG. 3A to rotate relative to the body of FIG. 3A.

FIG. 5A is a perspective view of a port subassembly of an embodiment, illustrating positioning of the port subassembly relative to a mounting plate.

FIG. 5B is an exploded view of a port holder and an adapter, showing the port holder coupled to a mounting plate.

FIG. 5C is a perspective view showing a mounting section of a snap-on port holder coupled to a mounting plate.

FIG. 5D is an exploded view showing a hinged snap-on port holder and an adapter, with the hinged snap-on port holder coupled to a mounting plate.

FIGS. 6A-6D are perspective views illustrating mounting and dismounting of a snap-on port holder of an embodiment.

FIG. 6E is perspective view for showing relative sizes of dimensions for a mounting section and an engagement member according to an embodiment.

FIG. 7A is a perspective view of a cable connection module of an embodiment having a slotted mounting plate that is extendable.

FIG. 7B is a detailed view of an extendable portion of the mounting plate of FIG. 7A.

FIG. 8A is a perspective view of the cable connection module of FIG. 7A with the mounting plate in an extended position.

FIG. 8B is a perspective view of the cable connection module of FIG. 7A with the mounting plate in an extended position and the interface portion of the module rotated relative to the body of the module.

FIG. 9A is a perspective view of an adapter mount, adapter, and cable connection terminals, the adapter mount having multiple adapter mount openings and being suitable for use in interface portions of embodiments or in other cable connection applications.

FIG. 9B is a perspective view of an adapter mount like that of FIG. 9A, with all of the adapter mount openings accommodating respective adapters, and with each adapter accommodating respective cable connection terminals.

DETAILED DESCRIPTION

Examples of systems and methods are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
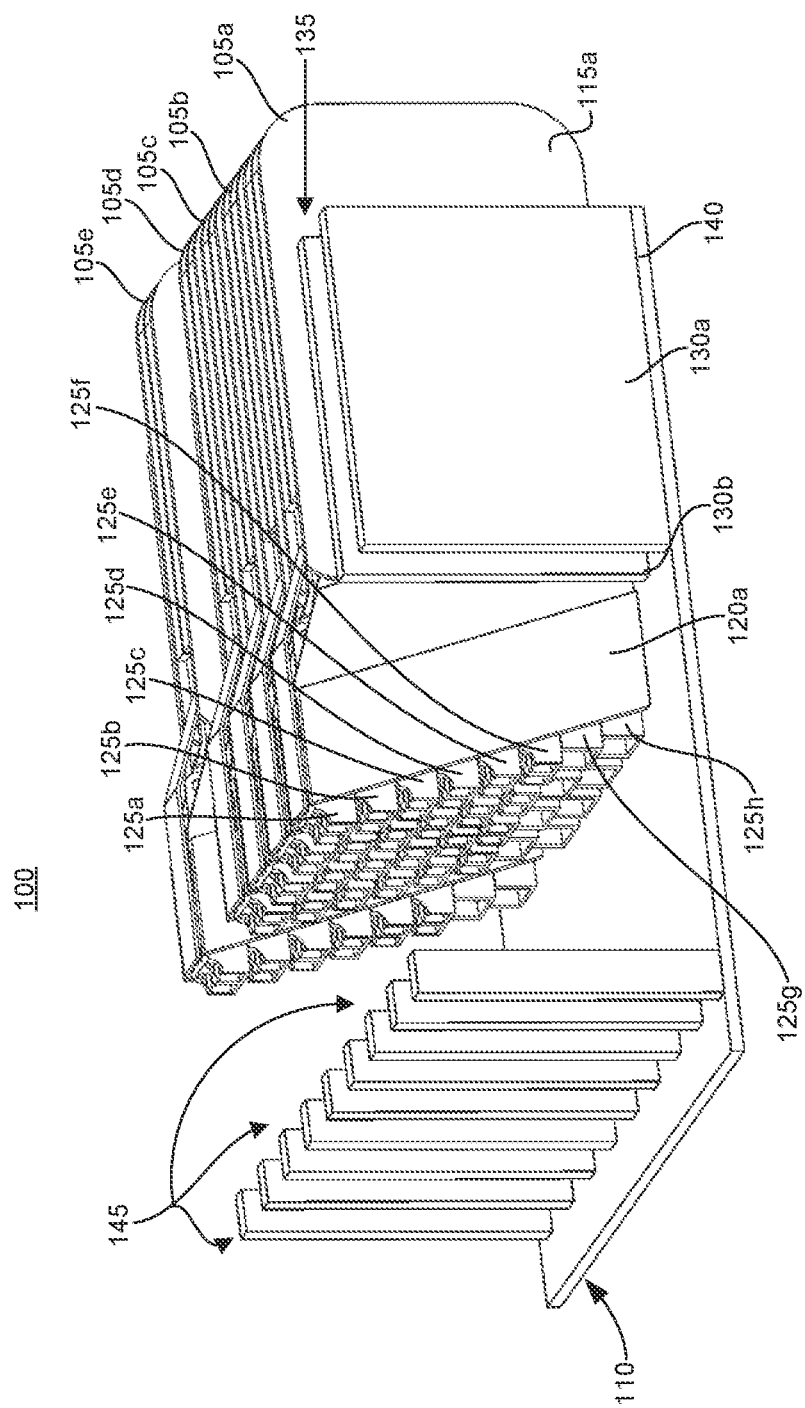
FIG. 1 is a perspective view of a cable connection assembly of an embodiment having an arrangement of modules within a multi-module chassis.

FIG. 1 is a perspective view of cable connection assembly 100 having an arrangement of cable connection modules 105a, 105b, 105c, 105d, and 105e of an embodiment within a multi-module chassis 110. Each of the cable connection modules 105a-105n has a body, e.g., body 115a of cable connection module 105a, and an interface portion, e.g., interface portion 120a of cable connection module 105a. Each interface portion is configured to accommodate a multiple of adapters, e.g., adapters 125a, 125b, 125c, 125d, 125e, 125f, 125g, and 125h of cable connection module 105a. The adapters may be secured within respective port holders (not shown) which, in turn, may be movably coupled to a mounting portion (not shown) of the interface portion. The adapters are configured to couple to respective cable connection terminals (not shown). For instance, adapter 125a is a dual-type adapter and may couple to two cable connection terminals. However, it should be noted the present technology is not limited to the use of dual-type adapters, and upon reviewing this disclosure one skilled in the art will readily appreciate the wide range of adapters and adapter combinations that may be employed with the technology. For example, single-type adapters may be used, as illustrated by a comparison of adapters 125a-125f to adapters 125g and 125h.

The cable connection modules 105a-105e of FIG. 1 may be said to be in a stacked arrangement within chassis 110. In this regard, chassis 110 may include a multiple of separation walls, e.g., separation walls 130a and 130b, which are configured to accommodate the cable connection modules 105a-105e in a stacked arrangement. As can be seen from FIG. 1, separation walls 130a and 130b define a slot 135 into which a cable connection module may be placed. Each of cable connection modules 105a-105e is placed in a similar slot, and by way of example it is noted that cable connection module 105a is placed in a slot defined by separation wall 130b and another separation wall which is not shown. As can be further seen from FIG. 1, the separation walls 130a and 130b are attached to a base 140 of the chassis 110. Also, the chassis 110 may include a multiple of cable separators 145, which are attached to the base 140. The cable separators 145 may be used to position cables coupled to the adapters, e.g., adapters 125a-125h, through the cables' respective cable connection terminals. The cable separators 145 are optional, and the cable connection assembly 100 need not include any cable separators. Further, if cable separators 145 are included they may number one or more.

It should be noted that the cable connection assembly 100 may be oriented as desired depending on the application. In an illustrative application, the cable connection assembly 100 is placed in a rack or cabinet having shelves in a plane generally parallel to the ground, in which case the base 140 of chassis 110 is in a plane generally parallel to the ground and the cable connection modules 105a-105e are then stacked in a generally horizontal direction with respect to the ground.

It should be further noted that the chassis 110 of FIG. 1 is merely illustrative of a chassis that may be used to group cable connection modules 105a-105e into a cable connection assembly 100. Many alternative forms of chassis may be substituted for chassis 110, and in view of this disclosure one skilled in the art will readily appreciate the wide range of alternative chassis that may be employed.

Turning now to FIG. 2A, the figure shows a perspective view of a cable connection module 200 of an embodiment apart from any chassis. Cable connection module 200 includes a body 205, an interface portion 210 and a multiple of adapters 215a, 215b, 215c, 215d, 215e, 215f, 215g, and 215h. The cable connection module 200 may be the same as cable connection module 105a. Nevertheless, as can be seen from FIG. 2A, cable connection module 200 includes an engagement structure 220 positioned on body 205. The engagement structure 220 may be a shaped protrusion extending from body 220, in which case a chassis for accommodating cable connection module 200 may include a wall having a recess shaped to compliment the engagement structure 220 so as receive the engagement structure 220 and thereby secure the cable connection module 200 in the chassis. For instance, separation wall 130a of chassis 110 may include a recessed portion for receiving engagement structure 220 and thereby secure cable connection module 200 in slot 135. As an alternative, engagement structure 220 may be a recess that is configured to accommodate a protrusion on a wall of a chassis.

FIG. 2B is a perspective view of the cable connection assembly 100 of FIG. 1 with an arrow 225 in FIG. 2B, directed from FIG. 2A, showing how cable connection module 200 may be added to cable connection assembly 100 by placement in slot 135.

In any event, FIG. 2B shows cable connection module 105c having the interface portion 120c rotated relative to the body 130c. Also shown in FIG. 2B is a cable connection terminal 250 positioned in a dual-type adapter 255 of cable connection module 105c, and more specifically, positioned into an outer port 260a of dual-type adapter 255. The cable connection terminal 250 has a first end 250a inserted into the adapter 255 and a second end 250b for connecting to a cable (not shown). In some embodiments the cable connection terminal 250 is a fiber optic cable connection terminal, the adapter 255 is a fiber optic adapter, and the cable is a fiber optic cable.

As illustrated in FIG. 2B, providing for rotation of the interface portion 120c of cable connection module 105c relative to the body 130c of cable connection module 105c facilitates access to the ports of cable connection module 105c, e.g., outer port 260a. For example, one seeking to remove cable connection terminal 250 from outer port 260a, could rotate the interface portion 120c upward away from base 140 and then easily grasp and remove the cable connection terminal 250.

FIG. 3A is a cutaway view of the cable connection module of 105c as depicted in FIG. 2B. FIG. 3A shows the internal structure of the interface portion 120c and of the body 130c, with the interface portion 120c rotated relative to the body 130c. As can be seen from FIG. 3A, adapter 255 includes four ports, the outer port 260a, an outer port 260b, an inner port 260c, and an inner port 260d. The inner ports 260c and 260d are shown with respectively inserted inner cable connection terminals 305 and 310. The inner cable connection terminals 305 and 310 may be coupled to internal cables (not shown) so that, for example, a signal received at the cable connection module 105c through a cable attached to cable connection terminal 250 is communicated to an internal cable coupled to inner cable connection terminal 305 for routing by the internal cable. Also shown in FIG. 3A is a port holder 315 which holds adapter 255 and connects the adapter 255 to the interface portion 120c in a movable fashion. In the embodiment of FIG. 3A, the port holder 315 is coupled to the interface portion 120c so that the port holder 315 may rotate about an axis passing through point P of the interface portion 120c. Further, since the adapter 255, the cable connection terminal 250 and the internal cable connection terminals 305 and 310 are secured by the port holder 315, the adapter 255, the cable connection terminal 250 and the internal cable connection terminals 305 and 310 may rotate with the port holder 315 about the axis through point P.

The combination of the port holder 315, adapter 255, and internal cable connection terminals 305 and 310 make up a port subassembly 320 that may be employed in the cable connection module 105c. The FIG. 3A embodiment includes a multiple of such port subassemblies 325. While many alternative forms of port subassembly may be applied with the presently disclosed technology, for brevity of description the technology will be described in the context of port subassemblies liked that of port subassembly 320.

Referring back to FIG. 3A, it can be seen that port subassemblies 325 may be connected to a mounting portion, e.g., to a mounting plate 330, of interface portion 120c, with each one of the port subassemblies 325 being rotatably coupled in a manner like that of subassembly 320. Providing for rotation of the port subassemblies 325 relative to the mounting portion further facilitates access to the port subassemblies 325. For example, when the interface portion 120c is rotated upward as shown in FIG. 3C, one seeking to access cable connection terminal 250 can space port subassembly 320 from the other port subassemblies of interface portion 120c so as to facilitate grasping of cable connection terminal 250.

Turning to FIG. 3B, the figure shows a detailed view of a rotation position stabilizer 340 that allows the interface portion 120c of cable connection module 105c to rotate relative to the body 130c of cable connection module 105c. The rotation position stabilizer 340 includes first circular portion 345 that is attached to, or integral with, the interface portion 120c, and a second circular portion 350 that is attached to, or integral with, the body 130c. The first circular portion 345 and second circular portion 350 each include alternating peaks and troughs. In this manner, the first circular portion 345 and the second circular portion 350 can move relative to one another when an external force is applied to rotate the interface portion 120c about an axis through point PP, but will hold their relative positions in the absence of an external force. The first circular portion 345 and the second circular portion 350 hold their relative position by way of the peaks and troughs of the first circular portion 345 being respectively positioned in the troughs and peaks of the second circular portion 350. That is, the first circular portion 345 and the second circular portion 350 resist deflection in their radial directions, and thus when there is a shift from the aligned position of the first circular portion 345 and the second circular portion 350 a reactionary force acts to urge realignment. In addition, as an option the first circular portion 345 and the second circular portion 350 may be configured to be biased against each other when in the aligned position, to thereby provide further rotational stability.

The rotation position stabilizer 340 may also include a locking arm 355. The locking arm 355 may be sized and shaped to mate with a locking slot 360. The locking slot 360 may be formed, for example, by part of a bezel 365 of body 130c and a straight extension 370 from second circular portion 350. The locking arm 355 may be positioned in the slot 360 to lock the interface portion 120c in an unrotated position relative to the body 130c.

Figure 3C:
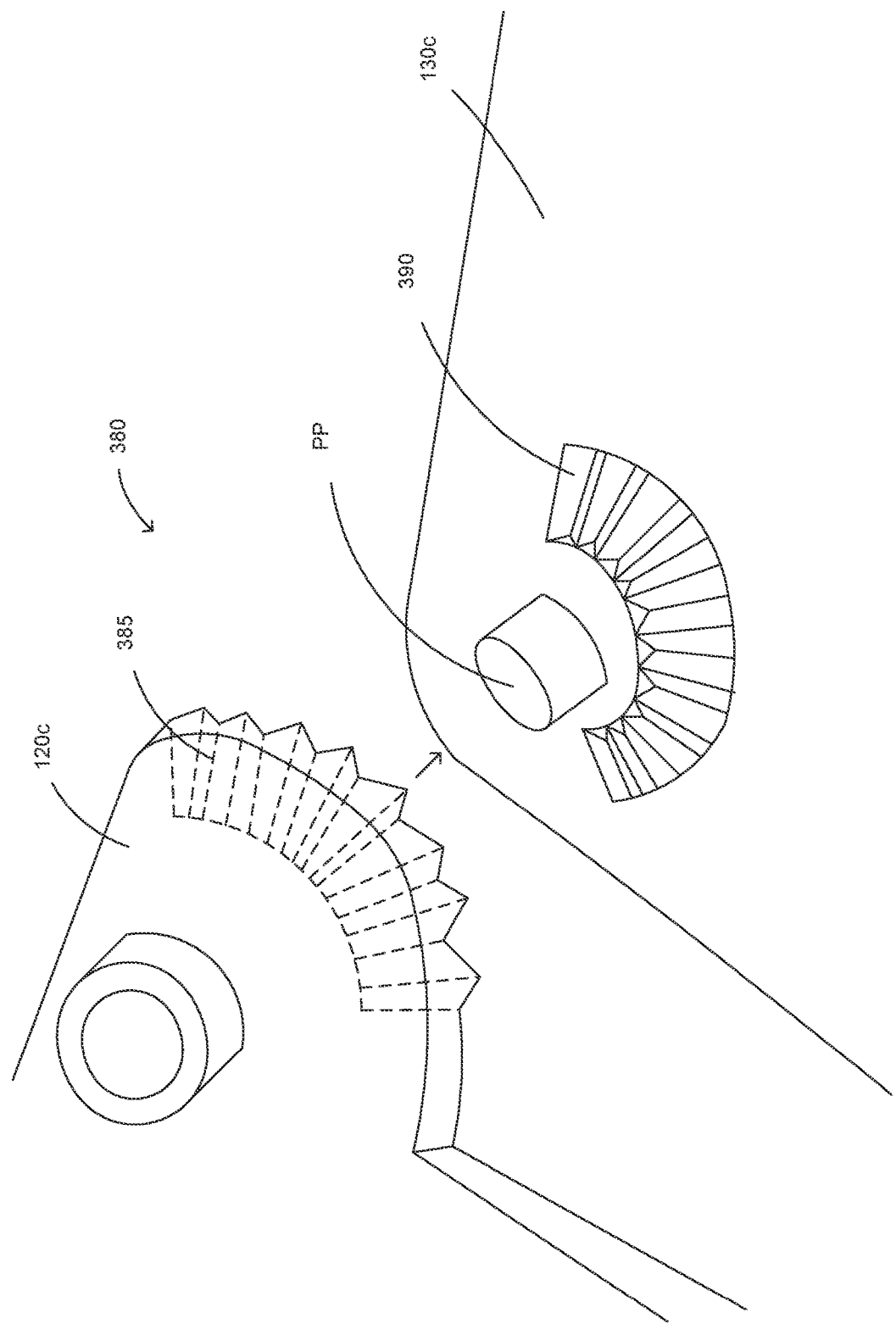
FIG. 3C is a perspective view of an alternative rotation position stabilizer.

FIG. 3C is a perspective view of an alternative rotation position stabilizer 380. The function of rotation position stabilizer 380 is similar to the function of the rotation position stabilizer 340. However, the rotation position stabilizer 380 includes a first circular portion 385 and a second circular portion 390, each having peaks and troughs that are oriented parallel to the interface portion and body, respectively; whereas in rotation position stabilizer 340 the peaks and troughs of the first circular portion 345 and second circular portion 350 are oriented perpendicular to the interface portion and body, respectively. In rotation position stabilizer 380, the first circular portion 385 and the second circular portion 390 hold their relative position by way of the peaks and troughs of the first circular portion 385 being respectively positioned in the troughs and peaks of the second circular portion 390. That is, the first circular portion 385 and the second circular portion 390 resist deflection in directions perpendicular to their radial directions, and thus when there is a shift from the aligned position of the first circular portion 385 and the second circular portion 390 a reactionary force acts to urge realignment. In addition, as an option the first circular portion 385 and the second circular portion 390 may be configured to be biased against each other when in the aligned position, to thereby provide further rotational stability.

Figures 4A, 4B:
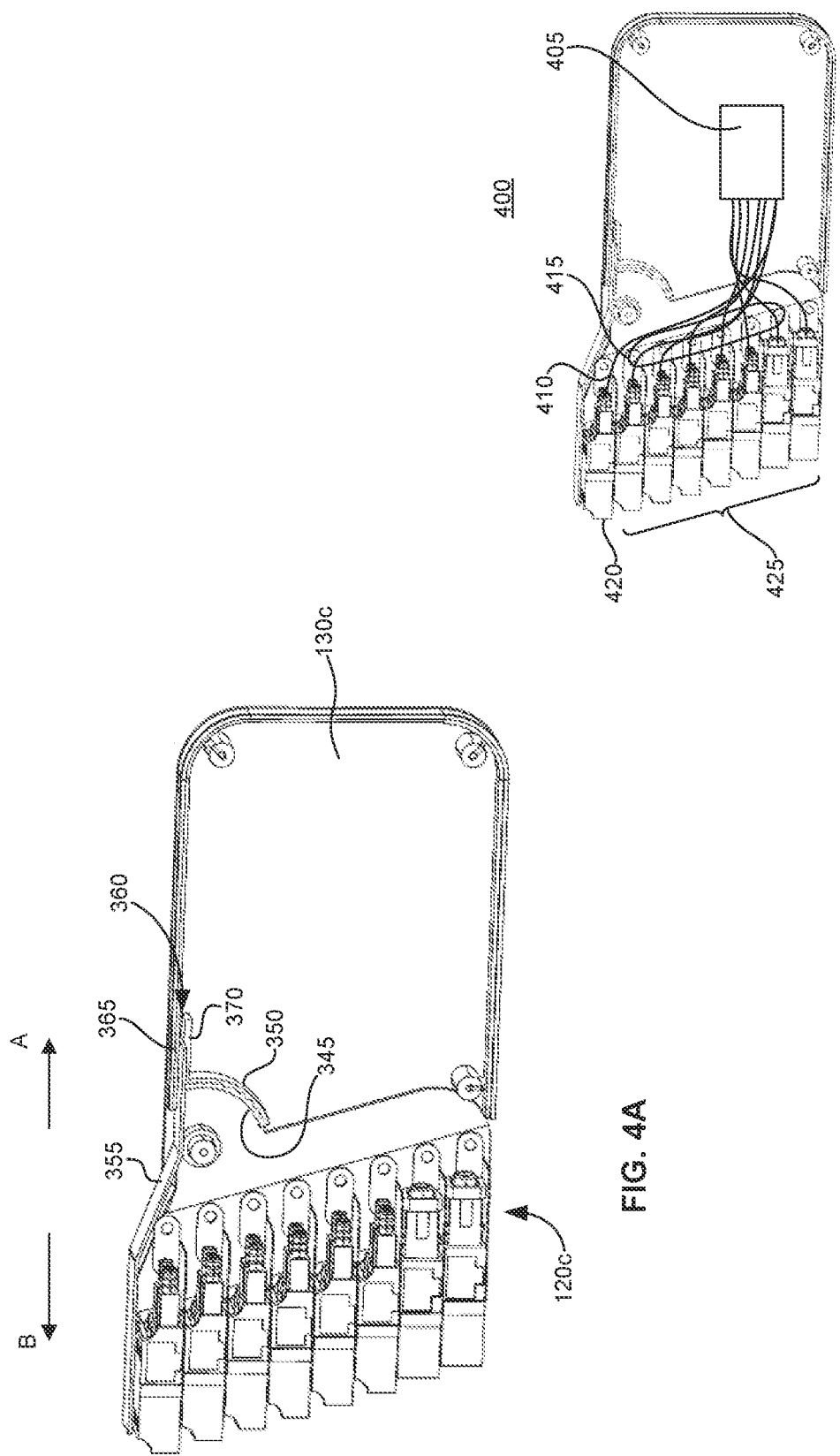
FIG. 4A is a cutaway view of a module of FIG. 3A, with the interface portion unrotated relative to the body and fixed in position.
FIG. 4B is a cutaway view of a cable connection module of an embodiment including an internal component and internal cables.

FIG. 4A is a cutaway view of the cable connection module 105c of FIG. 3A, with the interface portion 120c unrotated relative to the body 130c and locked in position. As can be seen from the figure, to lock the interface portion 120c in the unrotated position the interface portion 120c is placed in the unrotated position and then the locking arm 355 is moved in direction A so that the locking arm 355 is moved into the slot 360. To unlock the interface portion 120c, the locking arm 355 is moved in direction B.

Referring now to FIG. 4B, the figure shows a cutaway view of a cable connection module 400. The cable connection module 400 may include the elements of cable connection module 105c, but may also include an internal component 405 and internal cables 410 and 415. The internal component 405 may be, for example a fiber optic wavelength division multiplexer (WDM) filter or an optical splitter. In the case of the internal component 405 being a WDM filter, a fiber optic signal coupled to a port 420, for example, may be communicated to the WDM filter 405 via the internal cable 410, and demultiplexed into a multiple of fiber optic signals which are, in turn, respectively communicated to ports 425 via respective ones of the internal cables 415. In the case of internal component 405 being an optical splitter, a fiber optic signal coupled to a port 420, for example, may be communicated to the optical splitter 405 via the internal cable 410, and split into a multiple of fiber optic signals which are, in turn, respectively communicated to ports 425 via respective ones of the internal cables 415.

Turning now to FIG. 5A, the figure shows a perspective view of a port subassembly 505 including a port holder 510, an adapter 515, and an inner cable connection terminal 520. The figure illustrates positioning of the port subassembly 505 relative to a mounting plate 525 of a module interface portion. As can be seen from the figure, the port subassembly 505 may be positioned on the mounting plate 525 so as to rotate about an axis Z that is perpendicular to the mounting plate 525. In one such embodiment the port subassembly 505 may be rotatably attached to the mounting plate 525 by a screw or rivet passing through an opening 505a in the port assembly 505. Notably, the adapter 515 is a single-type adapter that includes a single outer port 515a and a single inner port 515b. The single inner port 515b is shown with inner cable connection terminal 520 inserted.

FIG. 5B is an exploded view of a port holder 530 and an adapter 535, showing the port holder 530 coupled to a mounting plate 540 of a module interface portion. In the FIG. 5B embodiment, the port holder 530 is rotatably coupled to the mounting plate by an engagement member 545 that has a head 545a and a shaft 545b (shown e.g., in FIGS. 5C, 6A, and 6B), with the head 545a having a diameter larger than the diameter of a port holder opening (not shown) through which the shaft 545b passes.

FIG. 5C is a perspective view showing a mounting section 550 of a snap-on port holder coupled to a mounting plate, e.g., mounting plate 540. As can be seen from the figure, the mounting section 550 includes an opening 550a and a tongue 550b bordering the opening 550a. The snap-on port holder may be rotatably coupled to the mounting plate 540 via an engagement member, e.g., engagement member 545. The opening 550a is dimensioned such that the head 545a of the engagement member 545 cannot easily pass through the opening 550a.

FIG. 5D is an exploded view showing a hinged snap-on port holder 555 and an adapter, e.g., adapter 535, with the hinged snap-on port holder 555 rotatably coupled to a mounting plate, e.g., mounting plate 540, of a module interface portion. The hinged snap-on port holder 555 may include a mounting section 550 like that shown in FIG. 5C and a holding portion 560 that is coupled to the mounting section 550 by a hinge 565.

Having discussed snap-on port holder embodiments in connection with FIGS. 5C and 5D, the operation of snap-on port holder embodiments will be discussed in more detail in connection with FIGS. 6A-6E, with reference to mounting section 550, engagement member 545 and mounting plate 540, by way of example.

FIGS. 6A-6D are perspective views illustrating how mounting section 550 of a snap-on port holder, and in turn the snap-on port holder itself, may be mounted on engagement member 545 and dismounted from engagement member 545. FIG. 6A shows the opening 550a of mounting section 550 placed above engagement member 545 in preparation for mounting. Then, by moving the mounting section 550 in a downward direction A, the engagement member 545 passes into opening 550a and the head 545a of the engagement member deflects tongue 550b relative to the remainder of the mounting section 550, as shown in FIG. 6B. That is, the tongue 550b is deformable in at least a first direction so that the mounting section 550 can be placed on the engagement member 545 without the tongue 550b blocking such placement. Next, the mounting section 550 may be moved in a sideways direction B, so that the position of the engagement member 545 is shifted within opening 550a and tongue 550b passes under the head 545a of engagement member 545. FIG. 6C shows the mounting section 550 and engagement member 545 after the tongue passes under the head 545a. As shown in in FIG. 6C, the mounting section 550, and thus the snap-on port holder corresponding to the mounting section 550, is rotatably mounted on the mounting plate 540 via engagement member 545.

To dismount the mounting section 550 from the engagement member 545, the mounting section 550 may be forced in an upward direction C, as shown in FIG. 6D. When the mounting section 550 is forced upward, the tongue 550b is deflected downward relative to the remainder of the mounting section 550 by head 545a of the engagement member 545, thereby creating a space sufficient to allow the head 545a to pass through the mounting section 550 and disengage from the mounting section 550. That is, the tongue 550b is deformable in at least a second direction so that the mounting section 550 can be removed from the engagement member 545 without the tongue 550b blocking such removing. Moreover, the mounting section 550 may deflect in one or more sideways directions, illustrated by arrows D and E, to accommodate removal of the mounting section 550 from the engagement member 545.

FIG. 6E is perspective view for showing relative sizes of dimensions for the mounting section 550 and the engagement member 545 according to an embodiment. As can be seen from the figure, the opening 550a of the mounting section 550 may define a shaft accommodating dimension L, a tongue surrounding dimension N, and a tongue bordering dimension M. As can be further seen from the figure, the head 545a of the engagement member 545 may have a head diameter O, and the shaft 545b of engagement member may have a shaft diameter P. In the embodiment, the size of the tongue surrounding dimension N is greater than or equal to the size of the head diameter O; the size of the head diameter O is greater than the size of the shaft accommodating dimension L; the size of the shaft accommodating dimension L is equal to, or approximately equal to, the size of the tongue bordering dimension M; and the size of the tongue bordering dimension M is greater than or equal to the size of the shaft diameter P. Such sizes allow for the operations as described in FIGS. 6A-6D.

Turning now to FIG. 7A, the figure shows a perspective view of a cable connection module 700 according to an embodiment. The cable connection module 700 has a body 705 and an interface portion 710. The interface portion 710 is rotatable relative to the body 705 and includes a mounting plate 715 having a slot 720. The slot 720 is configured to accommodate one or more port holders, e.g., port holders 725 and, in turn, to accommodate one or more port subassemblies corresponding to the port holders, e.g., port subassemblies 730. As shown, the slot 720 may be aligned such that its longitudinal dimension is parallel to the longitudinal dimension of the mounting plate 715, although other arrangements of the slot 720 are possible. Further, the slot 720 and port holders 725 may be arranged such that the port holders 725 are free to rotate and translate within the slot 720. By allowing for rotation and translation of the port holders 725 within slot 720, the cable connection module 700 allows for rotation and translation of the port subassemblies 730, and thereby facilitates access to the port subassemblies 730.

In any event, the mounting plate 715 of cable connection module 700 may include an extendable portion 735. FIG. 7B is a detailed view of the extendable portion 735. In the depicted configuration, the extendable portion 735 extends in a longitudinal direction L with respect to the slot 720. The range of extension R may be determined by one or more guidance slots, e.g., guidance slots 740a and 740b. When the slot 720 is extended, the port holders 725 have a greater amount of space within the mounting plate in which they can move. Thus, when the extendable portion 735 is in an extended position, the degree to which the port holders 725 and associated port subassemblies 730 may translate is greater, thereby further facilitating access to the port subassemblies 730.

FIG. 8A is a perspective view of the cable connection module 700 of FIG. 7A with the extendable portion 735 of the mounting plate 715 in an extended position, and the interface portion 710 unrotated relative to the body 705. FIG. 8B is a perspective view of the cable connection module 700 module of FIG. 7A with the extendable portion 735 of the mounting plate 715 in an extended position and the interface portion 710 rotated relative to the body 705.

FIG. 9A is a perspective view of an adapter mount 900, an adapter 905, and cable connection terminals 910a, 910b, 910c, and 910d. The adapter mount 900 has a multiple of adapter mount openings (e.g., adapter mount openings 915-1, 915-2, and 915-3), and each of the adapter mount openings may have a rectangular shape defined by four interface portions. For example, adapter mount opening 915-1 is defined by a first interface portion 920i1, a second interface portion 92i2, a third interface portion 920i3, and a fourth interface portion 920i4. Further, each of the adapter mount openings is configured to accommodate an adapter. For instance, adapter mount opening 915-1 may accommodate adapter 905. In this regard, the first interface portion 920i1 and the second interface portion 920i2 of adapter mount opening 915-1 may be dimensioned for snap-fitting an adapter through engagement with interface portions 920i1 and 920i2.

In the FIG. 9A embodiment, the adapter mount 900 has a flat planar shape of uniform thickness as indicated by D. Accordingly, the four interface portions of each opening have a thickness D. In the embodiment, the first interface portion 920i1 and the second interface portion 920i2 may be fit into corresponding spaces defined by adapter portions so that the spaces respectively confine the first interface portion 920i1 and the second interface portion 920i2 in a thickness direction. The spaces in which the interface portions 920i1 and 920i2 fit are best seen in an adapter top view 930, which is included in FIG. 9A. As can be seen from the adapter top view 930, in combination with the other drawing elements, a first space 935s1 of adapter 905 may accommodate interface portion 920i1, and a second space 935s2 of adapter 905 may accommodate interface portion 920i2. As can also be seen, the first space 935s2 is formed between a first protrusion 940p1 and a first tab 945t1, and the second space 935s2 is formed between a second protrusion 940p2 and a second tab 945t2. When the adapter 905 is moved into the opening 915-1, with the tabs 945t1 and 945t2 leading the protrusions 940t1 and 940t2 into the opening 915-1, the tabs 945t1 and 945t2 flex inward—toward the center of the adapter 905—to allow the first interface portion 920i1 and the second interface portion 920i2 to pass respectively into spaces 935s1 and 935s2. Thus, upon the first tab 945t1 moving past the first interface portion 920i1 the first tab 940t1 snaps back into its unflexed position, thereby confining the first interface portion 920i1 in the first space 935s1, as the first interface portion 920i1 becomes bounded in the thickness direction by the first tab 945t1 and the first protrusion 940p1. Similarly, the second interface portion 920i2 becomes confined within the second space 935s2.

Nevertheless, after insertion of the adapter 905 into adapter mount opening 915-1, the adapter 905 is movable. That is, adapter mount opening 915-1 and the adapter 905 are sized so that the adapter 905 may move within the adapter mount opening 915-1 even after the first interface portion 920i1 and the second interface portion 920i2 of the adapter mount 900 are respectively confined within the first space 935s1 and the second space 935s2 of the adapter 905. In this regard, and with reference to FIG. 9A, a height dimension of adapter 905 is indicated by A, a height dimension of adapter mount opening 915-1 is indicated by B, and a thickness dimension of the first space 935s1 and the second space 935s2 is indicated by C. Using the A, B, and C convention, and with D denoting the thickness dimension of the first interface portion 920i1 and the second interface portion 920i2, embodiments of the adapter mount 900 and adapter 905 are provided with $A \times 1.1 < B$ and $D < C \times 0.8$. Sizing the adapter mount 900 and the adapter 905 in this manner allows the adapter 905 to be held by the adapter mount 900 while the adapter 905 is sufficiently movable with adapter mount 900 to facilitate manipulation of the adapter 905 by a human finger.

FIG. 9B is a perspective view of the adapter mount 900 of FIG. 9A, with all of the adapter mount openings 915-1 to 915-9 accommodating respective adapters 905-1 to 905-9. Each of the adapters 905-1 to 915-9 may be identical to adapter 905 of FIG. 9A. Further, each of the adapters 905-1 to 905-9 is shown accommodating respective cable connection terminals. For example, adapter 905-5 is shown accommodating cable connection terminals 960a, 960b, 960c, and 960d. The sizing of the adapter mount openings 915-1 to 915-9 and the adapters 905-1 to 905-9 allows the cable connection terminals of adjacent adapters to be readily accessed by a human finger. Such access is illustrated in FIG. 9B by showing how a human finger 950 may readily access the cable connection terminals 960a and 960b of adapter 905-5 by moving the adapters proximate adapter 905-5. For instance, adapter 905-5 may be an LC type adapter, cable connection terminals 960a-960d may be LC type cable connection terminals; and cable connection terminal 960a may be removed from adapter 905-5 by using finger 950 to press a lever 965a of cable connection terminal 960a to unlock the cable connection terminal 960a form the adapter 905-5 and then pulling the cable connection terminal 960a from adapter 905-5.

It should be noted that the arrangement shown in FIGS. 9A and 9B may be employed in a cable connection module such as the cable connection module 105c of FIG. 3A. For example, the FIG. 9B adapter mount 900 may take the place of, or serve as, the FIG. 3A port holders (e.g., port holder 315). In this manner, rather than include a multiple of port holders coupled to an interface portion in a movable fashion, the cable connection module 105c may include the adapter mount 900 integral with, or attached to, the interface portion, with the adapter mount accommodating the FIG. 3A adapters (e.g., adapter 255) while allowing the adapters to move relative to one another.

Embodiments of the present technology include, but are not restricted to, the following.

(1) A cable connection module including a body; and an interface portion rotatably coupled to the body, the interface portion configured to accommodate a plurality of port holders coupled to the interface portion in a movable fashion, and each of the port holders configured to hold one or more adapters for receiving respective cable connection terminals.

(2) The cable connection module according to (1), wherein the interface portion includes a mounting portion, and the mounting portion is configured to accommodate the plurality of port holders such that each of the port holders is independently movable relative to the mounting portion and independently movable relative to the other port holders.

(3) The cable connection module according to (2), wherein each of the port holders is independently translatable relative to the mounting portion and independently translatable relative to the other port holders, and each of the port holders is independently rotatable relative to the mounting portion and independently rotatable relative to the other port holders.

(4) The cable connection module according to (1,) further including a rotation position stabilizer.

(5) The cable connection module according to (4), wherein the rotation position stabilizer includes a first circular portion attached to, or integral with, the interface portion, and a second circular portion attached to, or integral with, the body, and wherein the first circular portion and second circular portion move relative to one another when an external force is applied to rotate the interface portion relative to the body but hold their relative positions in the absence of the external force.

(6) The cable connection module according to (1), further including one or more internal cables.

(7) The cable connection module according to (6,) further including an internal component, and wherein the internal component is coupled to one or more of the internal cables.

(8) The cable connection module according to (1), further including an engagement structure for securing the cable connection module in a chassis.

(9) The cable connection module according to (1), further including one or more adapters coupled to respective ones of the port holders.

(10) The cable connection module according to (9), further including one or more inner cable connection terminals coupled to respective ones of the adapters.

(11) The cable connection module according to (1), wherein the cable connection module is secured within a chassis that is configured to secure a plurality of cable connection modules.

(12) The cable connection module according to (11), wherein the chassis is configured to accommodate engagement structures on respective ones of the cable connection modules.

(13) The cable connection module according to (1), wherein the port holders comprise an adapter mount having a multiple of adapter mount openings.

(14) A port holder including a holding portion configured to hold one or more adapters for receiving respective cable connection terminals; and a mounting section configured for connection to a cable connection module in a movable fashion, the mounting section including an opening and a tongue, the opening configured to receive an engagement member of a mounting portion of the cable connection module, the mounting portion configured to accommodate a plurality of port holders, including the port holder, such that each of the port holders is independently movable relative to the mounting portion and independently movable relative to the other port holders, and the tongue being deformable in a first direction that allows the mounting section to be connected to the engagement member, and deformable in a second direction that allows the mounting section to be disconnected from the engagement member.

(15) The port holder according to (14), wherein the holding portion is coupled to the mounting section by a hinge.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A cable connection module comprising:
a body;
an interface portion rotatably coupled to the body, the interface portion configured to accommodate a plurality of port holders coupled to the interface portion in a movable fashion, and each of the port holders configured to hold one or more adapters for receiving respective cable connection terminals; and
a rotation position stabilizer including a lock, the rotation position stabilizer configured to allow the interface portion and the body to move relative to one another when an external force is applied to rotate the interface portion relative to the body, and to cause the interface portion and the body to the hold their relative positions in the absence of the external force, and the lock configured to lock the interface portion in an unrotated position relative to the body.

2. The cable connection module according to claim 1, wherein the interface portion comprises a mounting portion, and the mounting portion is configured to accommodate the plurality of port holders such that each of the port holders is independently movable relative to the mounting portion and independently movable relative to the other port holders.

3. The cable connection module according to claim 2, wherein each of the port holders is independently translatable relative to the mounting portion and independently translatable relative to the other port holders, and each of the port holders is independently rotatable relative to the mounting portion and independently rotatable relative to the other port holders.

4. The cable connection module according to claim 1, wherein the rotation position stabilizer comprises a first circular portion attached to, or integral with, the interface portion, and a second circular portion attached to, or integral with, the body, and wherein the first circular portion and second circular portion move relative to one another when an external force is applied to rotate the interface portion relative to the body but hold their relative positions in the absence of the external force.

5. The cable connection module according to claim 1, further comprising one or more internal cables.

6. The cable connection module according to claim 5, further comprising an internal component, and wherein the internal component is coupled to one or more of the internal cables.

7. The cable connection module according to claim 1, further comprising an engagement structure for securing the cable connection module in a chassis.

8. The cable connection module according to claim 1, further comprising one or more adapters coupled to respective ones of the port holders.

9. The cable connection module according to claim 8, further comprising one or more inner cable connection terminals coupled to respective ones of the adapters.

10. The cable connection module according to claim 1, wherein the cable connection module is secured within a chassis that is configured to secure a plurality of cable connection modules.

11. The cable connection module according to claim 10, wherein the chassis is configured to accommodate engagement structures on respective ones of the cable connection modules.

12. The cable connection module according to claim 1, wherein the port holders comprise an adapter mount having a multiple of adapter mount openings.

* * * * *